(12) United States Patent
Zhang et al.

(10) Patent No.: US 12,135,237 B1
(45) Date of Patent: Nov. 5, 2024

(54) THROUGH-BEAM PHOTOELECTRIC SENSOR AND ASSEMBLY METHOD

(71) Applicant: SHENZHEN HUAYIFENG TECHNOLOGY CO. LTD., Guangdong (CN)

(72) Inventors: Xiaoyi Zhang, Guangdong (CN); Chaofan Luo, Guangdong (CN); Wenqi Huang, Guangdong (CN); Wusheng Qu, Guangdong (CN)

(73) Assignee: SHENZHEN HUAYIFENG TECHNOLOGY CO. LTD., Guangdong (CN)

( * ) Notice: Subject to any disclaimer, the term of this patent is extended or adjusted under 35 U.S.C. 154(b) by 0 days.

(21) Appl. No.: 18/775,016

(22) Filed: Jul. 17, 2024

Related U.S. Application Data

(63) Continuation of application No. PCT/CN2022/133036, filed on Nov. 19, 2022.

(30) Foreign Application Priority Data

May 19, 2022 (CN) .......................... 202210544516.7

(51) Int. Cl.
*G01J 1/42* (2006.01)
(52) U.S. Cl.
CPC ........................................ *G01J 1/42* (2013.01)
(58) Field of Classification Search
CPC .......................................................... G01J 1/42
See application file for complete search history.

(56) References Cited

U.S. PATENT DOCUMENTS

| 3,996,476 | A | 12/1976 | Lazzara |
| 6,946,643 | B1 | 9/2005 | Fayfield |
| 2019/0285462 | A1* | 9/2019 | Nakamura ................ G01J 1/42 |
| 2023/0408369 | A1* | 12/2023 | Lin ....................... G01J 3/0272 |

FOREIGN PATENT DOCUMENTS

| CN | 203811189 U | 9/2014 |
| CN | 204902857 U | 12/2015 |
| CN | 108571989 A | 9/2018 |

(Continued)

OTHER PUBLICATIONS

International Search Report cited in corresponding International Patent Application No. PCT/CN2022/133036, mailed Jan. 20, 2023, 12 pages.

*Primary Examiner* — Tony Ko
(74) *Attorney, Agent, or Firm* — Cooper Legal Group, LLC

(57) ABSTRACT

A through-beam photoelectric sensor includes an emitter and a receiver, the emitter is opposite the receiver, the receiver is configured to receive an optical signal from the emitter, the emitter comprises a first housing, an emitter lens, a first PCB, a lamp panel and an emission lamp, the emitter lens is embedded in the first housing, a light hole is formed in the lamp panel, the emission lamp is welded on the lamp panel and clamped in the light hole, a limit block is provided in the first housing, the lamp panel is detachably mounted on the limit block, and the first PCB is sleeved over the limit block and engaged with the lamp panel, such that a wick of the emission lamp is aligned with an optical center of the emitter lens. An assembly method is applied to the through-beam photoelectric sensor.

10 Claims, 8 Drawing Sheets

(56) References Cited

FOREIGN PATENT DOCUMENTS

| CN | 109375234 | A | 2/2019 |
| CN | 211824468 | U | 10/2020 |
| CN | 215158599 | U | 12/2021 |
| CN | 215177799 | U | 12/2021 |
| CN | 115060296 | A | 9/2022 |

\* cited by examiner

THROUGH-BEAM PHOTOELECTRIC SENSOR AND ASSEMBLY METHOD

CROSS-REFERENCE TO RELATED APPLICATION

This application is a continuation of PCT application serial no. PCT/CN2022/133036, filed on Nov. 19, 2022 and claims benefit of Chinese patent application serial no. 202210544516.7, filed on May 19, 2022. The entireties of PCT application serial no. PCT/CN2022/133036 and Chinese patent application serial no. 202210544516.7 are hereby incorporated by reference herein and made a part of this specification.

TECHNICAL FIELD

The present application relates to the field of photoelectric sensors, and in particular, to a through-beam photoelectric sensor and an assembly method.

BACKGROUND ART

Currently, a photoelectric sensor is a device for converting an optical signal into an electrical signal. Generally, a photoelectric sensor includes three parts, namely an emitter, a receiver and a detection circuit. For a through-beam photoelectric sensor, the emitter and the receiver are two separate parts, and the two separate parts are required to be mounted at opposite positions in normal use respectively.

Specifically, referring to FIG. 1, in an existing comparable product, the emitter mostly has only one PCB main board 52, while an emission lamp 6 and other elements are all welded on the PCB main board 52. An emitter lens 31 is mounted on an emitter housing. In the actual assembly process, the wick of the emission lamp 6 and the emitter lens 31 are required to be center aligned, otherwise a light spot emitted from the emission lamp 6 may be seriously eccentric. However, in a welding process by which the emission lamp 6 is welded on the PCB main board 52, an operator is prone to obliquely weld the emission lamp 6, or the PCB main board 52 is not precisely mounted in the emitter housing, which indirectly causes position deviation of the emission lamp 6 relative to the emitter lens 31. In the above two cases, the wick of the emission lamp 6 on the PCB main board 52 may not be aligned with the emitter lens 31 at the emitter housing.

For the above related art, there exists a drawback that the emission lamp may not be easily aligned with the emitter lens during welding.

SUMMARY

A through-beam photoelectric sensor includes an emitter and a receiver, the emitter shall be opposite the receiver, the receiver is configured to receive an optical signal from the emitter, the emitter includes a first housing, an emitter lens, a first PCB, a lamp panel and an emission lamp, the emitter lens is embedded in the first housing, a light hole is formed in the lamp panel, the emission lamp is welded on the lamp panel and clamped in the light hole, a limit block is provided in the first housing, the lamp panel is detachably mounted on the limit block, and the first PCB is in plug-in connection with the limit block and engaged with the lamp panel, such that a wick of the emission lamp is aligned with an optical center of the emitter lens.

Compared with the existing technique, by which the lamp panel is directly welded on the first PCB, in the present application, the lamp panel and the first PCB are two assemblies and separately mounted in the first housing, such that the position of the emission lamp of the lamp panel may be more conveniently adjusted and stabilized. It is only required to position the lamp panel, to preliminarily position the lamp panel. Then the first PCB is inserted in the limit block and the lamp panel, such that the position of the lamp panel may be further stabilized, in view of this, the wick of the emission lamp and the optical center of the emitter lens may be directly arranged on a same horizontal line, so as to solve the problem that the wick of the emission lamp may not be aligned with the center of the emitter lens well in the existing technique. Meanwhile, the reject ratio in assembly and production processes is reduced, thereby reducing the manufacturing cost of the whole product, and improving the manufacturability of the product.

Optionally, the limit block is mounted on an inner side wall of the first housing, the limit block is configured with a positioning groove, and the lamp panel is configured to be inserted in the positioning groove.

By the above technical scheme, the lamp panel with the emission lamp is snapped to the limit block, the limit block is close to the emitter lens, a precise positioning may be indirectly realized by precisely positioning the lamp panel. Moreover, the lamp panel and the first PCB are separately mounted, if one of the two is defect, it is only necessary to handle the defect one independently, thus reducing the cost of the bad product.

Optionally, two limit blocks are provided, each of the two limit blocks is configured with the positioning groove, openings of the two positioning grooves are facing each other, and the lamp panel is configured to abut against bottoms of the two positioning grooves.

Compared with the case where the lamp panel is fixed by only one limit block, two limit blocks clamp two sides of the lamp panel respectively, such that the lamp panel is fixed more firmly. Moreover, the lamp panel is directly placed in the two positioning grooves, the position of the lamp panel is not required to be adjusted, thereby greatly improving the assembling efficiency.

Optionally, each of the openings of the two positioning grooves is provided with a guide inclined plane, and through the guide inclined plane, the lamp panel is inserted in the two positioning grooves.

The guide inclined plane is provided at the groove opening of the positioning groove, such that the worker can more easily insert the lamp panel into the positioning groove when assembling the lamp panel, by which the lamp panel is inserted along the guide inclined plane.

Optionally, a positioning pin is fixedly mounted on each of the two limit blocks, a positioning hole is formed in the first PCB, and the first PCB is in plug-in connection with the positioning pin through the positioning hole.

The first PCB is an important part of the sensor and must be firmly mounted in the first housing, by the above technical schema the first PCB is in plug-in connection with the positioning pin, so as to mount and stabilize the first PCB simply and conveniently.

Optionally, a cross sectional area of the positioning pin decreases from bottom to top.

By the above-mentioned technical solution, the positioning pin has a thin upper part and a thick lower part, such that the first PCB may be conveniently sleeved over the positioning pin, and the first PCB is more tightly sleeved over the positioning pin.

Optionally, the first housing is correspondingly provided with a first housing cover, a first snap block is configured to abut against the inner side wall of the first housing, the first PCB is located in a middle of the first snap block, a height difference between an upper surface of the first snap block and an upper surface of the first housing is consistent with a thickness of the first housing cover, and the first snap block abuts against the first housing cover, such that an upper surface of the first housing cover is flush with the upper surface of the first housing.

By the above-mentioned technical solution, the first snap block abuts against the first housing cover, and the first housing cover covers the first housing to form a complete device. Meanwhile, the upper surface of the first housing cover is flush with the upper surface of the first housing, such that an overall space structure of the sensor is reduced, and the sensor looks more attractive.

Optionally, a second snap block is configured to abut against a side wall of the first snap block, the second snap block is located opposite to the limit block, a height of the second snap block is consistent with a height of the limit block, and the second snap block is configured to abut against the first PCB.

By the above-mentioned technical solution, the height of the end of the first PCB sleeved over the limit block is consistent with the height of the end thereof away from the limit block, such that the first PCB is horizontally mounted in the first housing, such that weight of the whole sensor is uniform. The first PCB is more firmly mounted.

Optionally, the first housing is configured with a slot for signal line, the slot for signal line is configured to be passed through by a signal line, the slot for signal is configured with a dispensing groove for storing industrial glue, and a side wall of the slot for signal line is convexly provided with a convex ring for further positioning the signal line.

The signal line may be led out from the sensor, while the wire at the slot for signal line tends to loose over time. Therefore, the dispensing groove is defined at the slot for signal line, the worker dispenses the glue into the dispensing groove, and the glue may stick part of the signal line and the first housing together. In order to further fasten the signal line on the sensor, the convex ring at the slot for signal line plays a role in fastening and limiting the signal line.

There is provided an assembly method, including: welding the emission lamp on the lamp panel, clamping the emission lamp in the light hole, inserting the lamp panel in a positioning groove to align a wick of the emission lamp with an optical center of the emitter lens preliminarily, sleeving the first PCB over a positioning pin and simultaneously engaging the first PCB with the lamp panel to further stabilize the lamp panel, and covering a first housing cover to connect the first housing cover and the first housing.

By the above-mentioned technical solution, the lamp panel and the first PCB are mounted separately and then welded into a whole, the whole assembly process is simple and convenient. After the optical center of the emitter lens is guaranteed to be aligned with the wick of the emission lamp, the first PCB is mounted, thus greatly reducing the reject ratio of the sensor.

DETAILED DESCRIPTION

Figure 1:
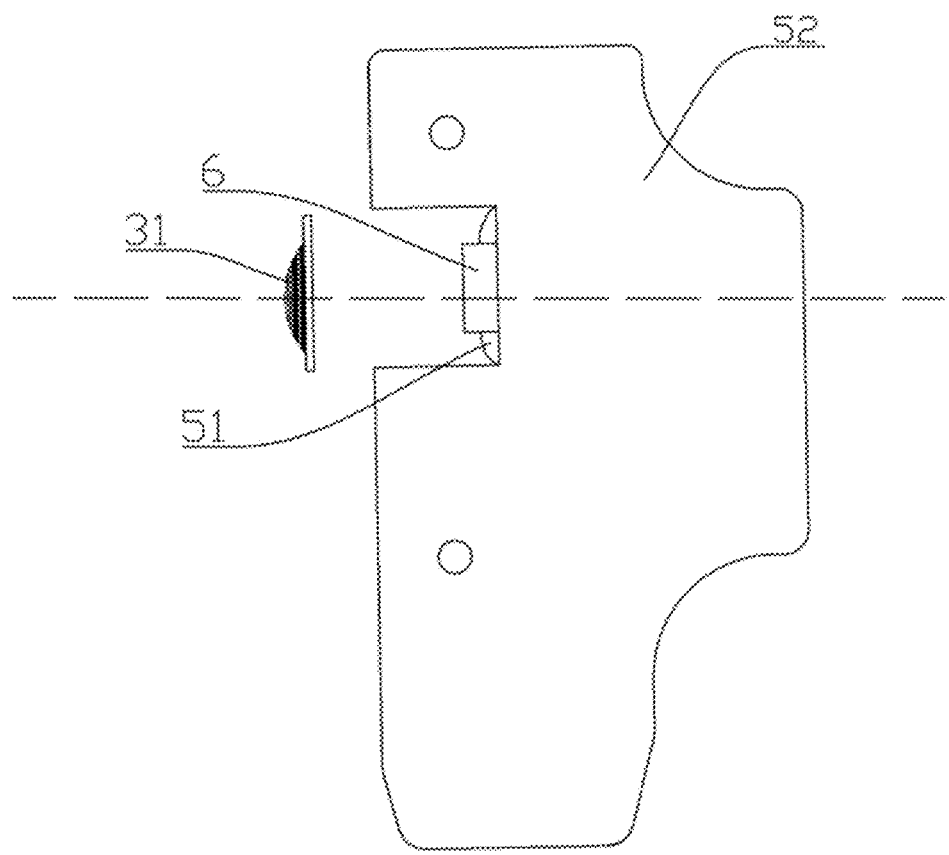
FIG. 1 is a schematic diagram showing the internal structure of an emitter of a through-beam photoelectric sensor in the existing technique.
Figure 2:
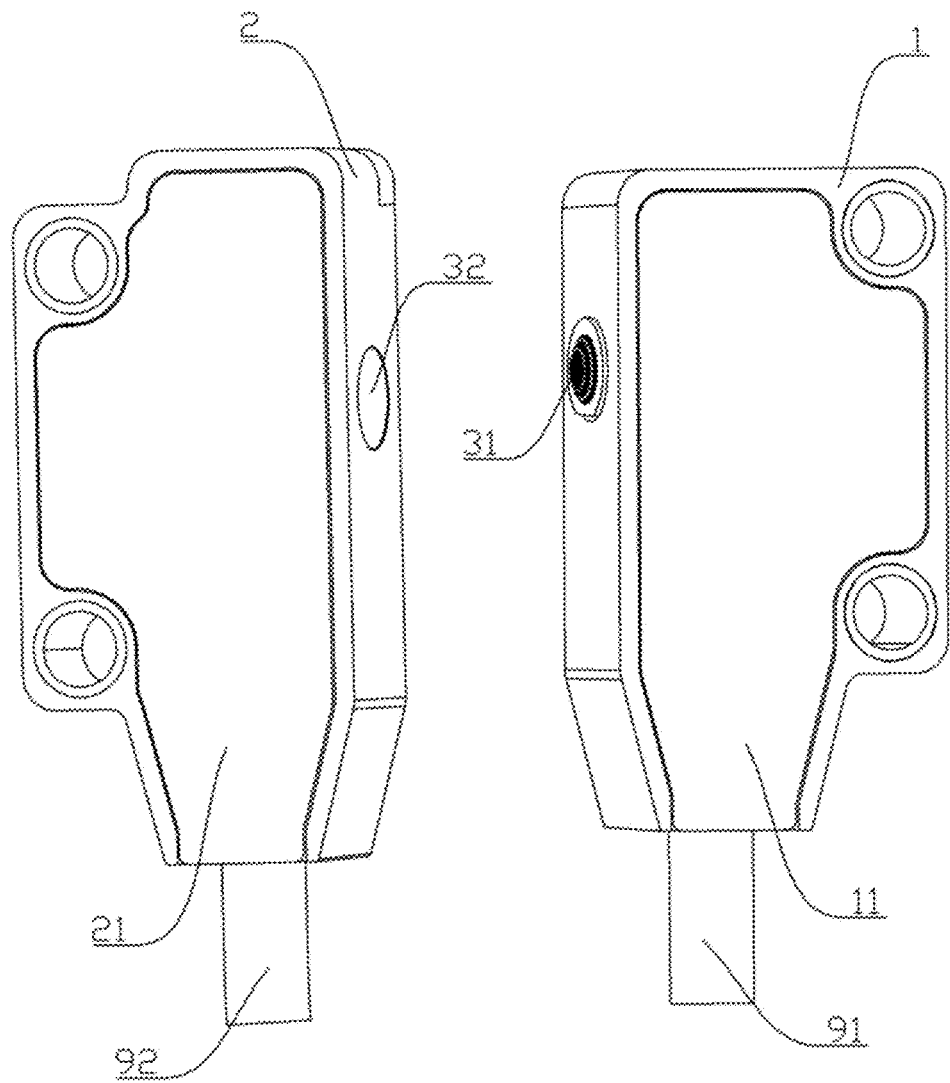
FIG. 2 is a schematic diagram showing the overall structure of the through-beam photoelectric sensor according to the present embodiment.

Referring to FIG. 2, a through-beam photoelectric sensor includes an emitter and a receiver, the emitter is opposite the receiver, and the receiver is configured to receive the optical signal from the emitter. The receiver includes the second housing 2, the second housing cover 21, the second PCB (not marked), the second signal line 92 and a receiver lens 32. The second housing 2 is in snap-in connection with the second housing cover 21. The second PCB is fixedly mounted in the second housing 2, the receiver lens 32 is embedded in a side face of the second housing 2, the second signal line 92 is electrically connected with the second PCB to transmit an electrical signal, and the second signal line 92 passes through and out of the bottom of the second housing 2.

Figure 3:
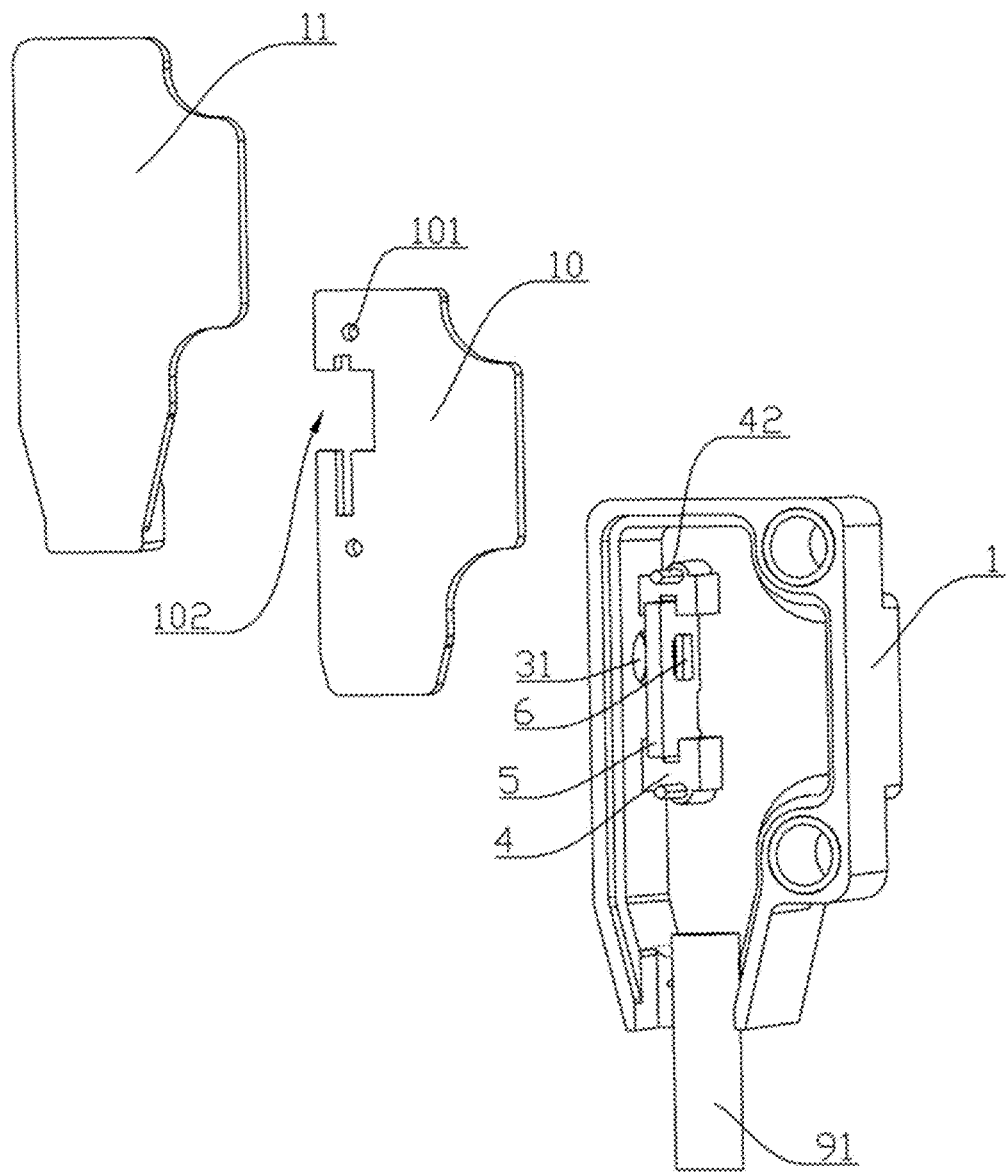
FIG. 3 is a schematic exploded diagram of the emitter in the present embodiment.

Referring to FIG. 3, the emitter includes the first housing 1, the first housing cover 11, the first PCB 10, the first signal line 91, an emitter lens 31, a lamp panel 5 and an emission lamp 6. The emitter lens 31 is embedded in a side face of the first housing 1, two limit blocks 4 are mounted in the first housing 1. The limit block 4 may be rectangular, cylindrical or polygonal, which is rectangular in the present embodiment, and one surface of the limit block 4 is fixedly connected with a side face of the first housing 1 provided with the emitter lens 31.

Referring to FIG. 3, the shape of the first PCB 10 is consistent with that of the end face of the first housing 1. Two positioning holes 101 are formed in the first PCB 10, the positioning pins 42 are inserted in the positioning holes 101, respectively, and the first PCB 10 is sleeved over the positioning pins 42. An irregular groove 102 is formed in the first PCB 10, and the groove 102 may be fitted with a part of the lamp panel 5 higher than the limit block 4, to further fix the lamp panel 5.

Figure 4:
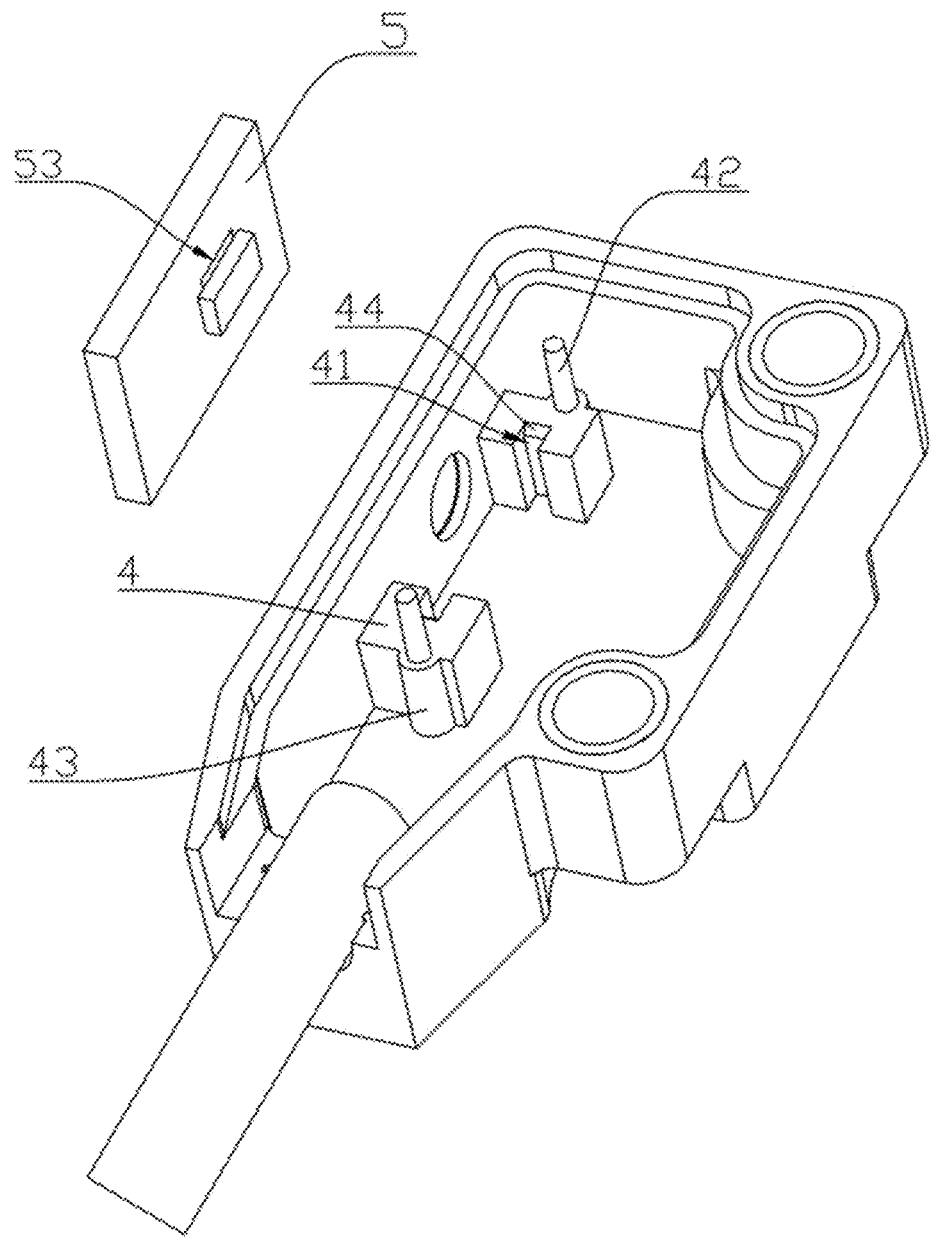
FIG. 4 is a partial schematic diagram of the emitter in the present embodiment.

Referring to FIG. 4, each of the two limit blocks 4 is configured with a positioning groove 41, the two positioning grooves 41 are opposite each other and the opening thereof are facing each other. The shape of the positioning groove 41 is hereby not specifically defined, which is designed corresponding to the shape of an object to be correspondingly inserted. In the present embodiment, the object to be inserted is the rectangular lamp panel 5. After the lamp panel 5 is inserted, two sides of the lamp panel 5 abut against the bottoms of the positioning grooves 41, respectively. The opening to be inserted by the lamp panel 5 is provided with a guide inclined plane 44, which is inclined downwards and has a bottom end facing the lamp panel 5. The lamp panel 5 may be more easily inserted into the positioning groove 41 from top to bottom along the inclined plane 44.

Referring to FIG. 4, an extension block 43 is provided on the limit block 4, the positioning pin 42 is integrally connected to the extension block 43, the extension block 43 is matched with the positioning pin 42 in shape, and the positioning pin 42 may be cylindrical or polygonal, and specifically, it is cylindrical in the present embodiment. The cross section of the extension block 43 is semicircular. The positioning pin 42 is connected to the upper surface of the junction of the extension block 43 and the limit block 4. The cross sectional area of the bottom end of the positioning pin 42 is larger than that of the top end thereof, and the radius of the cross section of the positioning pin 42 decreases from the bottom end to the top end.

Figure 5:
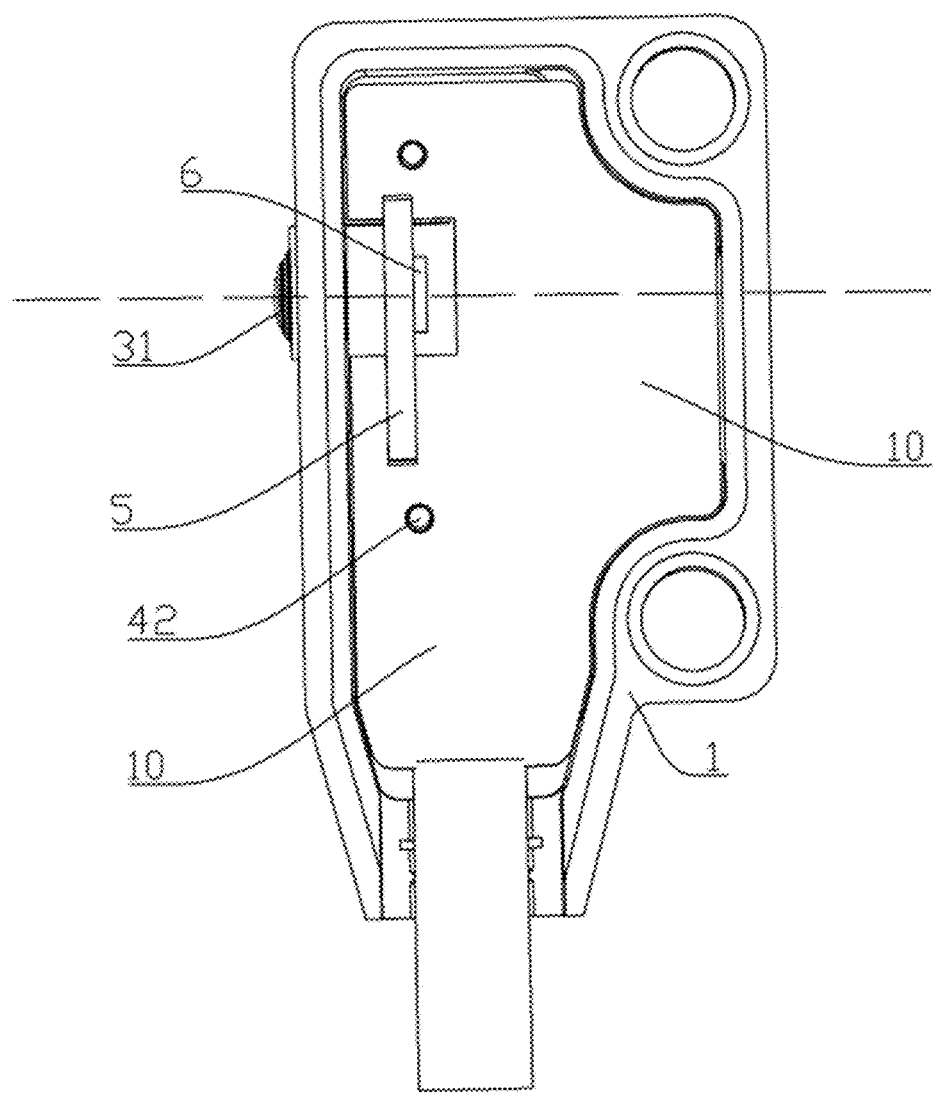
FIG. 5 is a partial schematic diagram showing a part of the emitter in the present embodiment.

Referring to FIG. 5, a light hole 53 (refer to FIG. 4) is defined in the lamp panel 5, the light hole 53 is opposite the emitter lens 31. The emission lamp 6 is welded on the lamp panel 5, and the wick of the emission lamp 6 is located within the range of the light hole 53, such that the wick of the emission lamp 6 and the optical center of the emitter lens 31 are located on a same horizontal line. The shape of the light hole 53 is determined by the field of view to be formed by light from the emission lamp 6.

Figure 6:
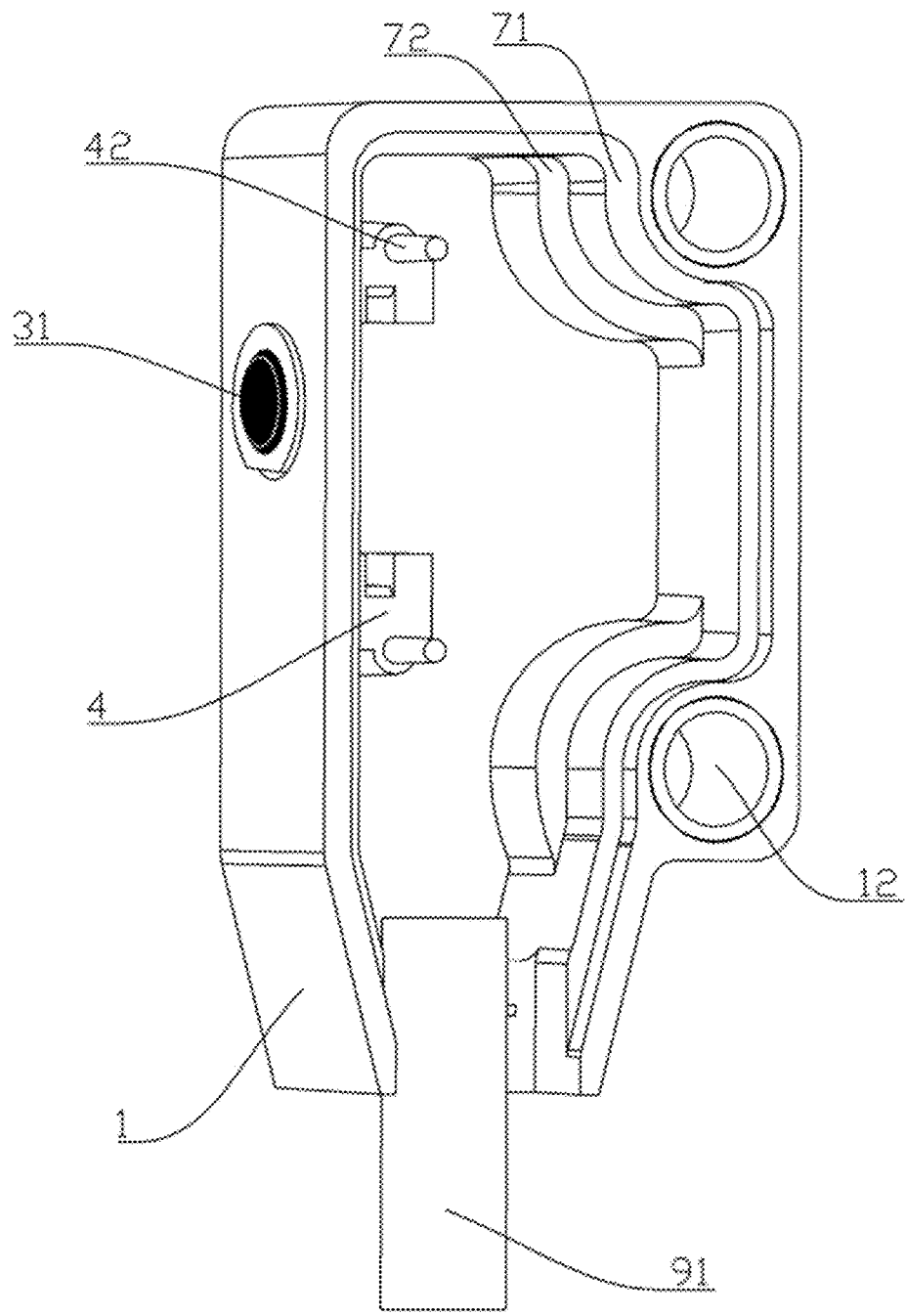
FIG. 6 is a partial schematic diagram of the emitter in the present embodiment from another perspective.

Referring to FIGS. 5 and 6, the first snap block 71 and the second snap block 72 are configured to abut against an inner side wall of the first housing 1 opposite to the emitter lens 31, the first snap block 71 is higher than the second snap block 72, the second snap block 72 is as high as the limit block 4, and the first PCB 10 sleeved over the positioning pin 42 abuts against a bearing surface of the second snap block 72 at the same time, such that the first PCB 10 is kept horizontal. The distance from an upper surface of the first housing 1 to an upper surface of the first snap block 71 is consistent with the thickness of the first housing cover 11 (refer to FIG. 3). When the first housing cover 11 is covered on the first housing 1, the first snap block 71 abuts against the first housing cover 11, at this point, the upper surface of the first housing 1 is flush with an upper surface of the first housing cover 11.

Referring to FIG. 6, the first housing 1 is configured with a mounting hole 12, and the number of the mounting holes 12 hereby is not specifically defined, as long as such a number of the mounting holes 12 may fix the emitter. The depth of the mounting hole 12 is smaller than the thickness of the first housing 1, such that a nut may be accommodated in the first housing 1 after a bolt is inserted in the mounting hole 12.

Figure 7:
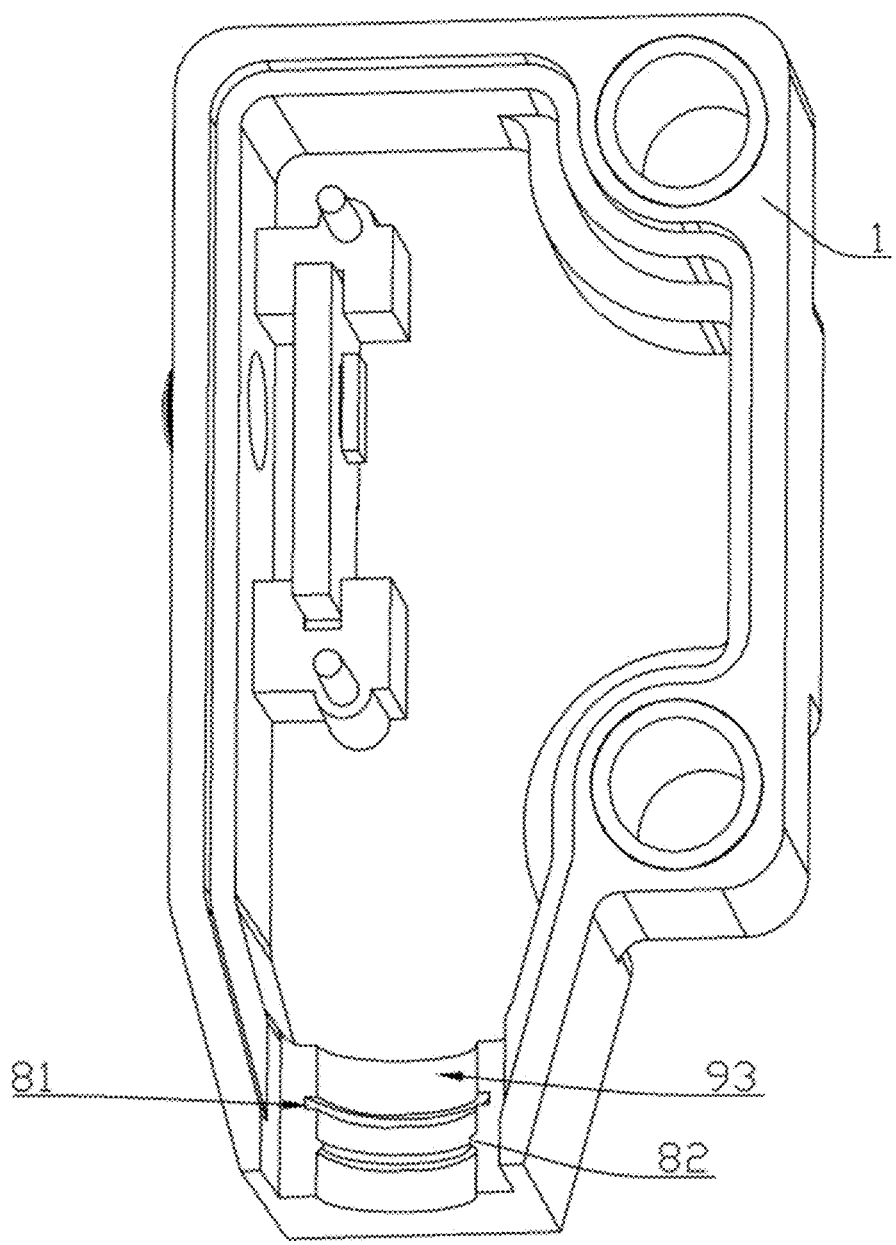
FIG. 7 is a partial schematic diagram of the first housing of the emitter in the present embodiment.

Referring to FIG. 7, a slot for signal line 93 is formed in a bottom end of the first housing 1, and the radius of the slot opening decreases gradually as the slot for signal line 93 extends outwards. The slot opening of the slot for signal line 93 is semicircular and connects the interior and exterior of the first housing 1, such that the first signal line 91 (refer to FIG. 6) is easy to pass out of the bottom of the first housing 1. The slot for signal line 93 is provided with a dispensing groove 81, a convex ring 82 is provided beside the dispensing groove 81, and both the dispensing groove 81 and the convex ring 82 surround the first signal line 91. Industrial glue is poured into the dispensing groove 81, thereby adhering the first signal line 91 and the first housing 1 together by the glue. The convex ring 82 clamps the first signal line 91 to further fasten the first signal line 91.

In the present embodiment, numbers of the dispensing grooves 81 and the convex rings 82 are not specifically defined, as long as such a number of the dispensing grooves and convex rings are sufficient to fasten the first signal line 91 on the first housing 1.

Figure 8:
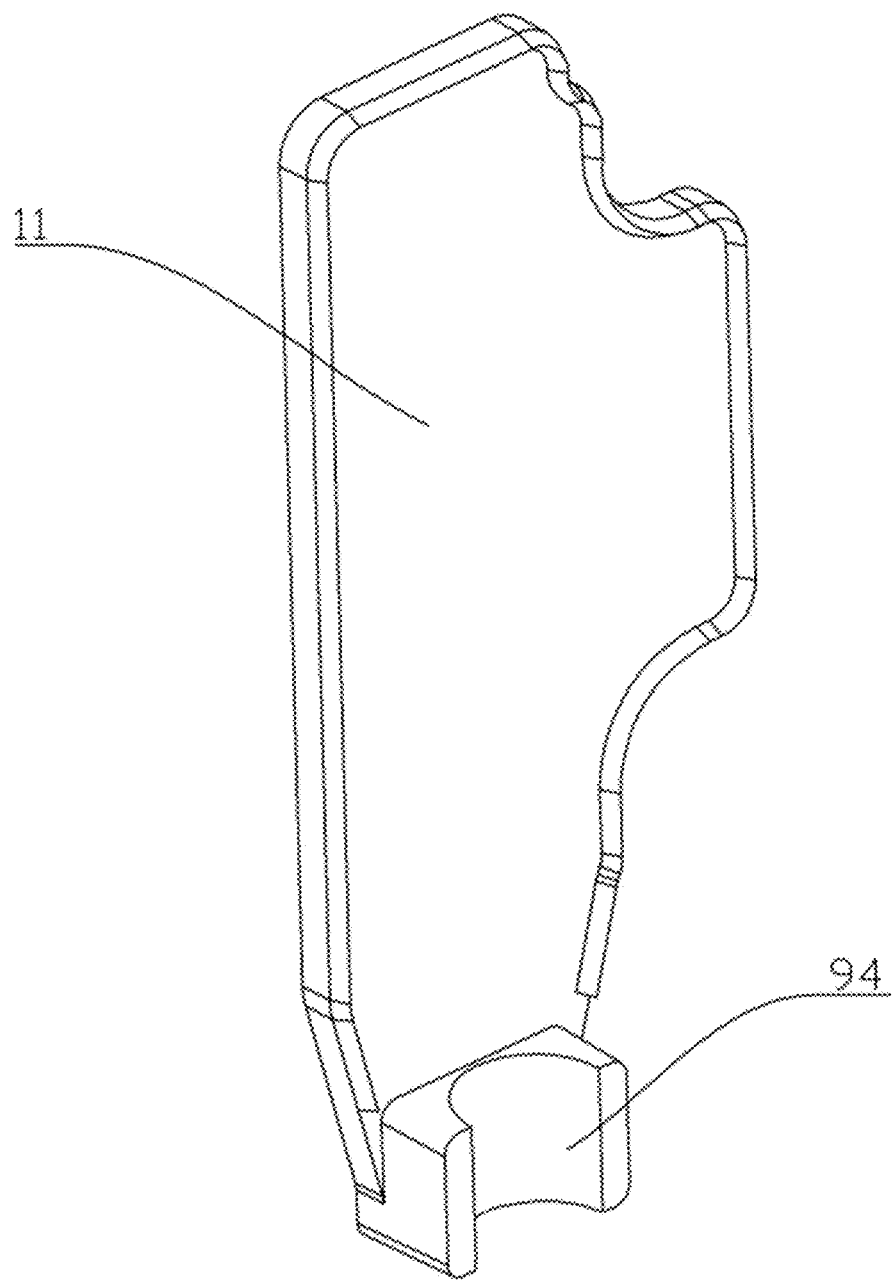
FIG. 8 is a schematic diagram showing the structure of the first housing cover of the emitter in the present embodiment.

Referring to FIGS. 7 and 8, a depression 94 extends from a bottom end of the first housing cover 11, and the depression 94 is matched with the slot for signal line 93, to fasten and position the first signal line 91 (refer to FIG. 6).

The assembly method for through-beam photoelectric sensor includes: welding the emission lamp 6 on the lamp panel 5, clamping the emission lamp in the light hole 53, inserting the lamp panel 5 in the positioning groove 41 to align the emission lamp 6 with the emitter lens 31, sleeving the first PCB 10 over the positioning pin 42, meanwhile, the first PCB is engaged with the lamp panel 5, and finally covering the first housing cover 11 to connect the first housing cover 11 and the first housing 1.

The assembly method for through-beam photoelectric sensor according to the embodiment of the present application is so implemented, that the emission lamp 6 is separately welded on the lamp panel 5, then lamp panel 5 is fixed in the first housing 1 to align the emission lamp 6 with the emitter lens 31, and the first PCB 10 is then fixed and welded to the lamp panel 5, so as to further stabilize the lamp panel 5.

The above embodiments are preferred embodiments of the present application, and the protection scope of the present application shall not be limited thereby. Therefore, equivalent changes made according to the structure, shape and principle of the present application shall be covered by the protection scope of the present application.

LIST OF REFERENCE NUMERALS 1 first housing
11 first housing cover
12 mounting hole
2 second housing
21 second housing cover
31 emitter lens
32 receiver lens
4 limit block
41 positioning groove
42 positioning pin
43 extension block
44 inclined plane
5 lamp panel
51 bonding pad
52 PCB main board
53 light hole
6 emission lamp
71 first snap block
72 second snap block
81 dispensing groove
82 convex ring
91 first signal line
92 second signal line
93 slot for signal line
94 depression
10 first PCB
101 positioning hole
102 groove

What is claimed is:

1. A through-beam photoelectric sensor, comprising an emitter and a receiver, wherein the emitter is opposite the receiver, the receiver is configured to receive an optical signal from the emitter, the emitter comprises a first housing, an emitter lens, a first printed circuit board (PCB), a lamp panel and an emission lamp, the emitter lens is embedded in the first housing, a light hole is formed in the lamp panel, the emission lamp is welded on the lamp panel and clamped in the light hole, a limit block is provided in the first housing, the lamp panel is detachably mounted on the limit block, and the first PCB is in plug-in connection with the limit block and engaged with the lamp panel, such that a wick of the emission lamp is aligned with an optical center of the emitter lens.

2. The through-beam photoelectric sensor according to claim 1, wherein the limit block is mounted on an inner side wall of the first housing, the limit block is configured with a positioning groove, and the lamp panel is configured to be inserted in the positioning groove.

3. The through-beam photoelectric sensor according to claim 2, wherein two limit blocks are provided, each of the two limit blocks is configured with the positioning groove, openings of the two positioning grooves are facing each other, and the lamp panel is configured to abut against bottoms of the two positioning grooves.

4. The through-beam photoelectric sensor according to claim 3, wherein each of the openings of the two positioning grooves is provided with a guide inclined plane, and through the guide inclined plane, the lamp panel is inserted in the two positioning grooves.

5. The through-beam photoelectric sensor according to claim 3, wherein a positioning pin is fixedly mounted on each of the two limit blocks, a positioning hole is formed in the first PCB, and the first PCB is in plug-in connection with the positioning pin through the positioning hole.

6. The through-beam photoelectric sensor according to claim 5, wherein a cross sectional area of the positioning pin decreases from bottom to top.

7. The through-beam photoelectric sensor according to claim 2, wherein the first housing is correspondingly provided with a first housing cover, a first snap block is configured to abut against the inner side wall of the first housing, the first PCB is located in a middle of the first snap block, a height difference between an upper surface of the first snap block and an upper surface of the first housing is consistent with a thickness of the first housing cover, and the first snap block is configured to abut against the first housing cover, such that an upper surface of the first housing cover is flush with the upper surface of the first housing.

8. The through-beam photoelectric sensor according to claim 7, wherein a second snap block is configured to abut against a side wall of the first snap block, the second snap block is located opposite to the limit block, a height of the second snap block is consistent with a height of the limit block, and the second snap block is configured to abut against the first PCB.

9. The through-beam photoelectric sensor according to claim 1, wherein the first housing is configured with a slot for signal line, the slot for signal line is configured to be passed through by a signal line, the slot for signal line is configured with a dispensing groove for storing industrial glue, and a side wall of the slot for signal line is convexly provided with a convex ring for further positioning the signal line.

10. An assembly method applied to the through-beam photoelectric sensor according to claim 1, comprising: welding the emission lamp on the lamp panel, clamping the emission lamp in the light hole, inserting the lamp panel in a positioning groove to align the wick of the emission lamp with the optical center of the emitter lens preliminarily, sleeving the first PCB over a positioning pin and simultaneously engaging the first PCB with the lamp panel to further stabilize the lamp panel, and covering a first housing cover to connect the first housing cover and the first housing.

* * * * *